March 18, 1969  H. K. CUMMINGS  3,434,027
SELF-REVERSING SYNCHRONOUS MOTOR
Filed June 1, 1965
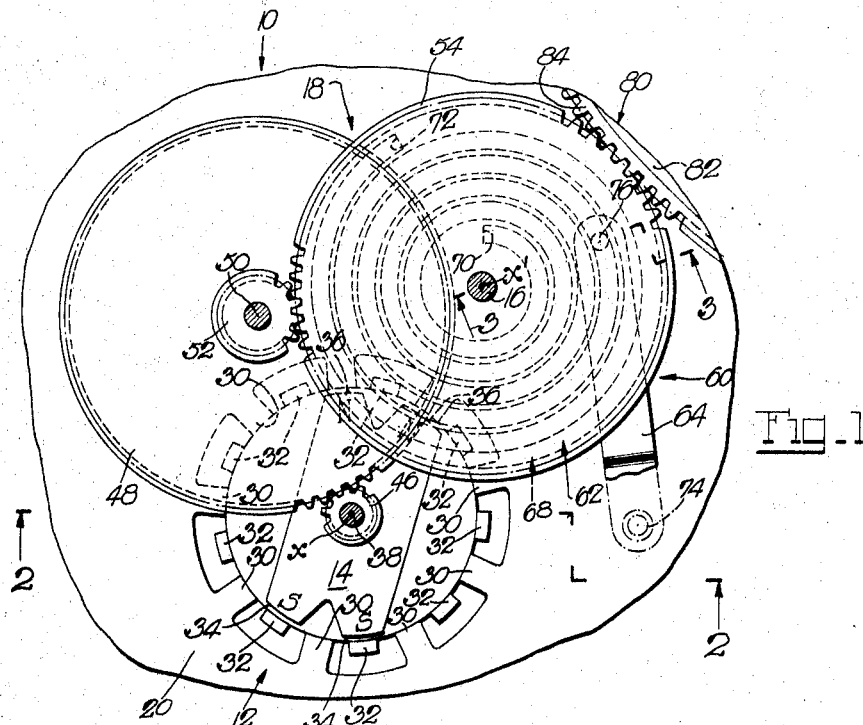
Fig. 1
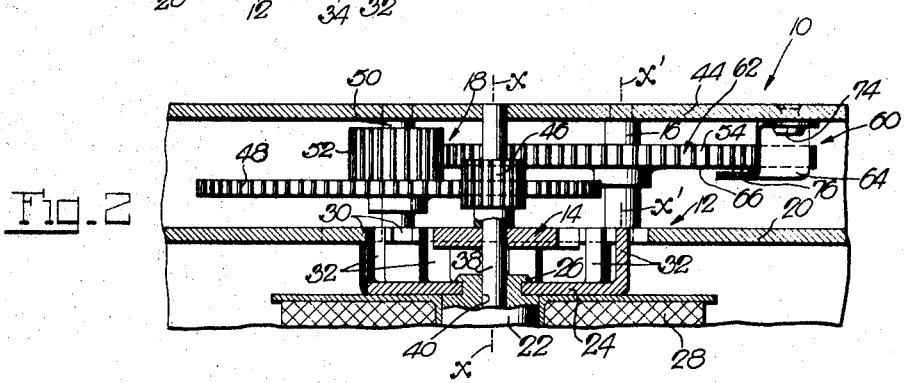
Fig. 2
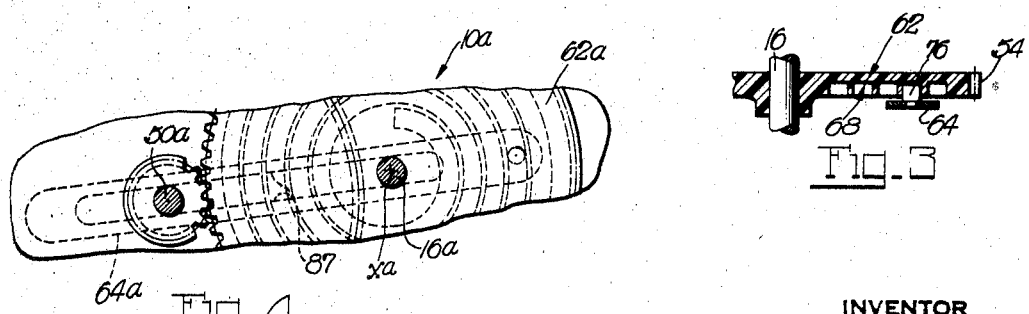
Fig. 4    Fig. 3
INVENTOR
*Harold K. Cummings*
BY
*Attorney*

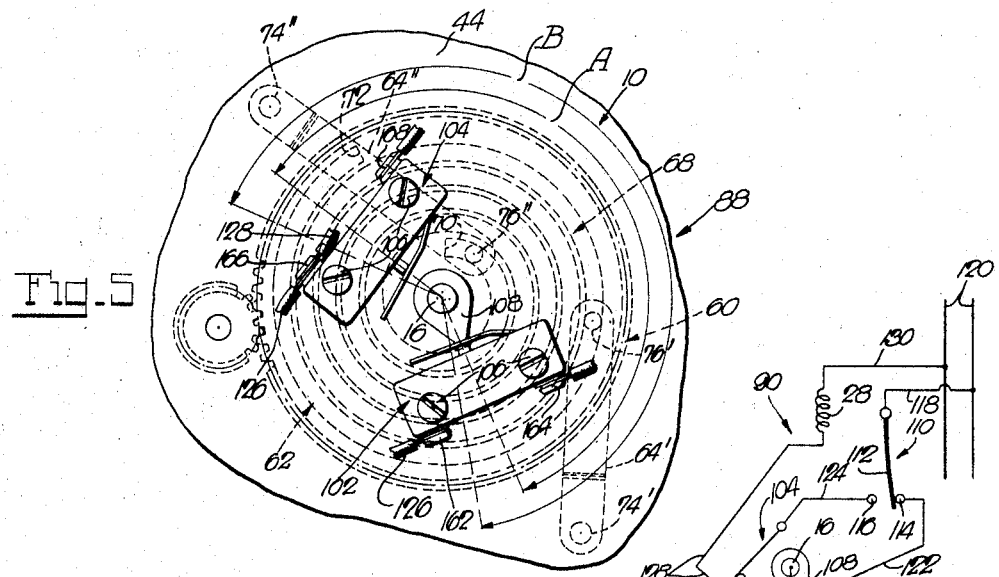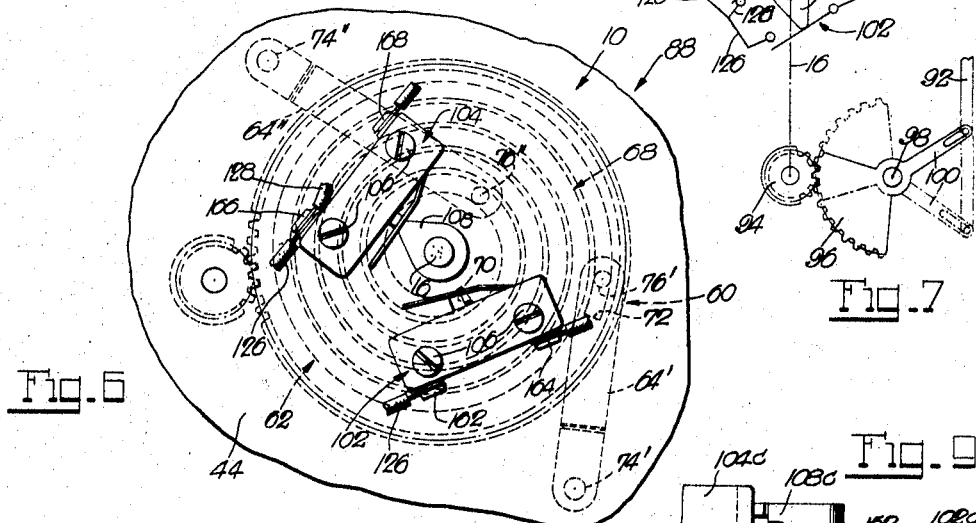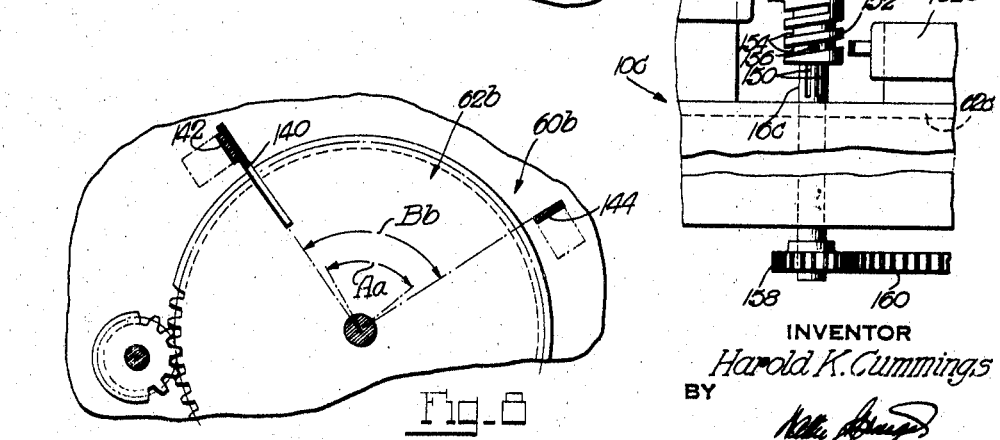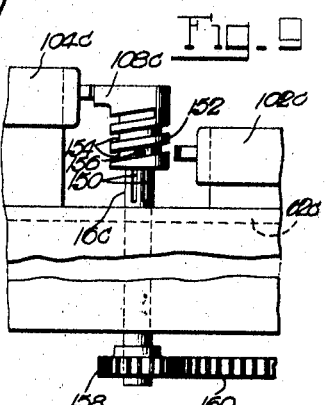
INVENTOR
Harold K. Cummings
BY
Attorney.

United States Patent Office 3,434,027
Patented Mar. 18, 1969

3,434,027
SELF-REVERSING SYNCHRONOUS MOTOR
Harold K. Cummings, Whitewater, Wis., assignor to Amphenol-Borg Electronics Corporation, Broadview, Ill., a corporation of Delaware
Filed June 1, 1965, Ser. No. 460,355
U.S. Cl. 318—282                                2 Claims
Int. Cl. H02p 1/22, 1/40, 3/20

ABSTRACT OF THE DISCLOSURE

The disclosure deals with a cycling device for a synchronous motor with a permanent-magnet rotor starting and running in either direction on energization of an associated field coil, with the device having a fixed part and a rotor-driven part with a continuous spiral-like track of more than one turn and shoulders at the opposite ends thereof, and an element having a follower and being mounted on the fixed part for movement with its follower in following relation with the track, whereby on the rotor drive the follower impacts with the shoulders, respectively, with ensuing reversal of the driven rotor and rotor-driven part on each such impact.

---

Motors of this general kind have a multipolar field of which alternate poles are of opposite polarity at any given instant and change their polarity in phase with alternating current applied to an associated field coil, and a permanent-magnet rotor the pole faces of which cooperate with the field poles in stepping the rotor in synchronism with the alternation of the applied current. These motors will self-start when on the initial polarization or polarizations of the field poles the rotor becomes unstable in any idle position and soon takes off and runs in either direction. For various applications these motors are required to run cyclically in opposite directions, and cycling devices to that end are already known. These cycling devices are of exceeding simplicity, having a rotor-driven part and provisions for its free rotation relative to the field structure through a fixed range, i.e., cycle range, with the ends of the range being established by abutments of predetermined angular spacing on the field structure which are in the path of an element on the driven part and on impact therewith reverse the latter and its driving rotor. While these cycling devices perform entirely satisfactorily insofar as periodic reversal of the motor and its load is concerned, their cycle range of less than one turn renders them inapplicable for an increasing number of motor applications which for efficiency and other purposes require cycling devices of larger cycle ranges.

It is an object of the present invention to provide a cycling motor of synchronous type having a cycle range of more than one turn and up to a considerable number of turns within limits, thereby to adapt the motor for the aforementioned increasing number of applications requiring larger cycle ranges.

It is another object of the present invention to provide a cycling motor of this type which not only has the aforementioned larger cycle range, but is also of at least the same simplicity as prior cycling motors. This is achieved, in preferred form, by providing the rotor-driven part with a multiturn track or spiral groove the opposite ends of which form the aforementioned abutments, and providing on the field structure an element in follower relation with this track and cooperating with the ends thereof in cyclically reversing the driven part and with it the driving rotor and driven motor load.

It is a further object of the present invention to provide a cycling motor of the aforementioned preferred form the effective cycle range of which may be kept anywhere within the cycle range afforded by the extent of the multiturn track on the driven part, by arranging on the field structure two elements in follower relation with this track and coordinated with the respective ends thereof to shorten the effective cycle range to any desired extent, including below one turn. With this arrangement, cycling motors with the same standard driven parts may advantageously be used for applications of many different cycle range requirements, by the simple expediency of providing two properly coordinated elements in follower relation with the standard tracks in the driven parts.

Another broad object of the present invention is to provide for temperature-modifying and other air-conditioning installations of all kinds a control which reliably and acurately responds to automatic demand signals, and which includes a cycling motor of this type and by virtue thereof is considerably simpler than prior controls of comparable reliable and acurate signal response under all conditions, including power restoration after interruption.

A further object of the present invention is to provide for a temperature-modifying installation, for example, a thermostat-responsive control with the aforementioned cycling motor, of which the motor is the immediate actuator of the installation for causing temperature modification by the latter upwards and downwards on cycling of the motor in opposite directions, respectively, and the remaining control consists of an arm or cam on the cycling motor shaft, and a simple circuit having therein, in addition to the thermostat and the field coil of the motor, merely two normally closed switches connected with the field coil and with the two signal contacts, respectively, of the thermostat, with the circuit being, for a temperature-modifying cycle, closed by the thermostat at either signal contact thereof and opened at the therewith connected switch by the cycling cam. With the control thus provided, and with the switches so coordinated with the cam that the latter will, on circuit closure via either thermostat contact, cycle in such direction as to open the respective switch for circuit opening just prior to reaching the nearest end of its cycle range, the control will cause the therewith connected installation to respond accurately to the thermostat dictates under all conditions, including power restoration after interruption and wrong-directional self-start of the motor for a particular signalled temperature modification.

It is another object of the present invention to provide for temperature-modifying and the like installations the aforementioned signal-responsive control in which the cycling motor may have an effective cycle range anywhere between less than one turn and a plurality of turns. In selecting for the cycling motor a cycle range of a plurality of turns, a motor of relatively small size and torque output may, through substantial gear reduction in its connection with the installation, reliably operate the latter for a signalled temperature modification, with the thus greater cycle range of the motor being compensated in the switch action of the cam by offsetting the switches axially of the cam and camming the latter, when cycling axially into operative alignment with the respective switches at the appropriate times. On the other hand, in selecting for the cycling motor a cycle range of less than one turn, the cam may perform its designated switch actions advantageously on mere rotational cyclic movement thereof, and the cam-carrying shaft may through a simple arm thereon be directly connected with the installation for actuation of the same as long as the torque output of the motor is adequate for the purpose.

Further objects and advantages will appear to those skilled in the art from the following, considered in conjunction with the accompanying drawings.

3

In the accompanying drawings, in which certain modes of carrying out the present invention are shown for illustrative purposes:

FIG. 1 is an enlarged fragmentary view of a cycling motor embodying the present invention;

FIGS. 2 and 3 are fragmentary sections through the same motor taken substantially on the lines 2—2 and 3—3, respectively, of FIG. 1;

FIG. 4 is an enlarged fragmentary view of a cycling motor embodying the present invention in a modified manner;

FIGS. 5 and 6 are enlarged fragmentary views of a control unit embodying the present invention, showing the unit in different operating conditions;

FIG. 7 is a diagrammatic illustration of the control unit of FIGS. 5 and 6 applied to a control of an exemplary temperature-modifying installation, also in accordance with the present invention;

FIG. 8 is an enlarged fragmentary section through a control unit embodying thep resent invention in a modified manner; and FIG. 9 is an enlarged fragmentary view of a control unit embodying the present invention in a further modified manner.

Referring to the drawings, and more particularly to FIGS. 1 and 2 thereof, the reference numeral 10 designates a cycling synchronous motor having a field 12 and a rotor 14, and in the present instance also an end shaft 16 and a speed-reduction drive 18 between the rotor 14 and shaft 16. The field 12 comprises a magnetic field plate 20 which usually is attached to a casing (not shown) that carries a magnetic core 22, another or inner magnetic field plate 24 which at 26 may be staked to the core 22 (FIG. 2), and a field coil 28 surrounding the core 22. The plates 20 and 24 have inner and outer field poles 30 and 32, respectively, which are coordinated with each other and with the rotor axis $x$ in conventional manner.

The rotor 14 is a permanent magnet and has pole faces 34 and 36 of the respective indicated permanent polarities (FIG. 1). The rotor 14 is carried by a shaft 38 which is journalled with one end in a suitable, preferably lubricated, bearing aperture 40 in the core 22, and is in this instance further journalled with its other end in the wall of a gear cover 44 on the field plate 20.

The speed-reduction drive 18 is a gear train which comprises in this instance two reduction stages of which the first stage is formed by a pinion 46 on the rotor shaft 38 and a meshing gear 48 on a shaft 50 which is suitably journalled with its ends in the field plate 20 and gear cover 44. The next and final reduction stage is formed by a pinion 52 turning with the gear 48 and a meshing gear 54 on the end shaft 16 which is journalled with its ends in the field plate 20 and gear cover 44.

In operation of the motor, i.e., on applying AC to the field coil 28, the field poles 30 and 32 will have opposite polarities at any instant, and their polarities will change with the alternation of the current supplied to the field coil, with the rotor 14 stepping in phase with the current in well-known manner. The rotor 14 will, on energization of the field coil, start and run in either direction, with the rotor becoming unstable in any idle position on the first or subsequent polarization of the field poles 30, 32 and soon take off in whichever direction it has a predominant urge to go.

The present motor 10, being a cycling motor, has a cycling device 60 which in this instance is formed by two parts 62 and 64. Part 62 is in this instance the earlier described gear 54 with its rotary axis $x'$ which is provided with a continuous track 68 about this axis of an extent in excess of 360 degrees and preferably of a plurality of turns, with the track having shoulders 70 and 72 at its opposite ends. The track 68 is in this instance provided in the lower face 66 of the part 62 and is in its preferred

4 form a spiral groove 68 about the axis $x'$ having a plurality of turns, and opposite end walls which form the shoulders 70 and 72. The other part 64 of the cycling device 60 is an arm element which at 74 is pivoted on the gear cover 44 and carries a follower 76 that projects into the spiral groove 68. The spirally grooved part 62 and the therewith cooperating follower arm 64 thus provide for free rotation of the part 62 and its shaft 16 relative to the field 12 through an angular range substantially equal to the longitudinal extent of the multiturn spiral groove 68. Hence, in operation of the motor 10, the part 62 will alternately be rotor-driven in opposite directions, with the part 62 and the therewith drivingly connected elements, including the rotor 14, being reversed everytime either end wall 70 or 72 of the spiral groove 68 impacts with the follower 76 on the arm 64, as will be readily understood. The part 62 will, in motor operation, thus cycle back-and-forth in a range which in the present example (FIG. 1) falls somewhat short of five turns.

The motor 10 of the relatively large cycle range just mentioned may serve for numerous applications. A typical application for which this motor is suitable is for a stand with a cycling support for a display device, such as a Christmas tree, for example, especially if such device is electrically lightable by plug-in in a nearby commercial power line. Thus, the cycling motor 10 may be embodied in such a stand 80 (FIG. 1) of which the cycling support 82 has a gear part 84 in mesh with the gear formation 54 on the cycling motor part 62. The ratio between the gear part 84 and gear formation 54 may be such that the support 82 will by the cycling motor part 62 be cycled back-and-forth through approximately one turn, whereby the dispay device in the support 82, such as an electrically lighted Christmas tree, for example, will be displayed all around, yet the light cord therefrom may be plugged in a nearby fixed outlet without becoming entangled with the cycling support or tree therein. Also, the stand just described cycles the display device therein, such as the exemplary lighted Christmas tree, at relatively low speed which makes not only for optimum and most enjoyable display of the device and optimum safety of the stand in operation, but also for minimum torque requirements of the cycling motor which, therefore, may be of relatively small size and correspondingly low cost. This is achieved, of course, by the preferred drive of the cycling motor part 62 at reasonably reduced speed from that of the rotor 14, and the further reduced drive of the cycling support 82 at reduced speed from that of the cycling motor part 62.

While in the described cycling motor 10 of FIGS. 1 and 2 the follower arm 64 is, for its movement in follower relation with the spiral groove 68 in the cycling part 62, pivotally mounted on the field 12, FIG. 4 shows a cycling motor 10a of which the follower arm 64a is mounted on the field for rectilinear follower motion radially of the axis $xa$ of the cycling motor part 62a. To this end, the follower arm 64a is suitably supported for movement in a plane normal to the axis $xa$ and is guided for rectilinear movement in this plane by the shafts 16a and 50a which project through a longitudinal guide slot 87 in the follower arm 64a.

Cycling motors of this type also find advantageous use in the field of controlling temperature-modifying and similar installations responding to automatic demand signals. Thus, FIGS. 5 and 6 show the application of the exemplary cycling motor 10 of FIGS. 1 and 2 in a component or unit 88 of a control 90 (FIG. 7) for an installation (not shown) having in this instance a bar 92 which on longitudinal shift by the cycling motor in opposite directions causes the installation, in this example, to deliver heat and to shut off heat, respectively. To this end, the cycling motor shaft 16 carries in this instance a pinion 94 (FIG. 7) which is in mesh with a gear segment 96 on a shaft 98, with the gear segment 96 having an arm 100 connected with the bar 92.

The control component 88 includes, besides the motor 10 with its cycling device 60, two normally-closed switches 102 and 104 which at 106 are mounted on the gear cover 44 on the outside thereof for ready circuit connection, and an arm or cam 108 on the cycling shaft 16 which is adapted to open the respective switches 102 and 104 at appropriate times. In the contemplated operation of the control, the normally-closed switch 104 will be opened by the arm 108 on cycling of the latter from the position in FIGS. 5 and 7 counterclockwise into the position in FIG. 6, and the other normally-closed switch 102 will be opened by the arm 108 on cycling of the latter from the position in FIG. 6 clockwise into the position in FIGS. 5 and 7. These switches 102 and 104 are in the circuit of the field coil 28 of the motor which also includes a thermostat 110 (FIG. 7) having a temperature-responsive actuator, in this instance a bimetallic blade 112, and two signal contacts 114 and 116. The circuit of the field coil 28 comprises, in this instance, a lead 118 which connects the thermostat blade 112 with one side of a power line 120, leads 122 and 124 which connect the thermostat contacts 114 and 116 with the switches 102 and 104, respectively, leads 126 and 128 which connect the switches 102 and 104 with the field coil 28, and a lead 130 which connects the field coil 28 with the other side of the power line 120. The circuit of the field coil will thus be closed by the thermostat at that contact 114 or 116 thereof which is connected with the then closed switch 102 or 104. Thus, in the exemplary condition of the control shown in FIG. 7, the circuit of the field coil will be closed when the blade 112 of the thermostat engages the contact 116 thereof which is connected with the then closed switch 104. As soon as the field coil circuit is thus closed and the motor set in operation in consequence, the arm 108 will cycle counterclockwise (FIG. 7) until opening switch 104 and thereby opening the circuit. With the switch 104 then opened (FIG. 6), the next closure of the field coil circuit will ordinarily occur when the blade 112 of the thermostat engages the contact 114 thereof (FIG. 7) which is connected with the then closed switch 102 (FIG. 6), whereby the motor is again set in operation, cycling the arm 108 from the position in FIG. 6 clockwise into the position in FIGS. 5 and 7 to again open the field coil circuit at the switch 102.

It follows from the preceding that the arm 108 has an operative cycle range A of less than 360 degrees (FIG. 5). In order to confine the arm 108 to this operative range A on all self-starts of the rotor of the motor both right and wrong directionally, it is imperative correspondingly to shorten the effective range of the cycling device 60, i.e., to shorten the effective length of the exemplary plural-turn spiral groove 68 in the cycling motor part 62. This is achieved, in the present instance, by providing two follower arms 64' and 64" which at 74' and 74" are pivoted on the field structure of the motor and project with their respective followers 76' and 76" into the spiral groove 68. The follower arms 64' and 64" are coordinated with the switches 102 and 104 and with the spiral groove 68 to shorten and dispose the cycle range of the arm 108 afforded by the cycling device 60 such that on a wrong-directional self-start of the rotor of the motor in either switch-closing position of the arm 108 (FIGS. 5 and 6) the latter will be reversed into the right direction while still holding the respective switch open. Thus, assuming that on the next field coil energization the arm 108 in the switch-opening position of FIG. 5 will start in the wrong, clockwise, direction, the end wall 70 of the spiral groove 68 will impact with the nearby follower 76" on the arm 64" and reverse the motor and arm 108 into the right direction while the arm 108 still holds switch 102 open. Conversely, assuming that on the next field coil energization the arm 108 in the switch-opening position of FIG. 6 will start in the wrong, counterclockwise, direction, the end wall 72 of the spiral cam 68 will impact with the near- by follower 76' on the arm 64' and reverse the motor and arm 108 into the right direction while the arm 108 still holds switch 104 open. The effective cycling range of the arm 108 afforded by the cycling device 60, being of the exemplary extent B in FIG. 5, thus permits the arm 108 to start from either switch-opening position in the right or wrong direction, yet this arm will normally open only the next programmed switch 102 or 104 on approaching the same in the right predetermined direction.

Assuming now that the arm 108 is in the switch-opening position in FIGS. 5 and 7 in which the heat is shut off, and the thermostat blade 112 flexes, at lowering temperature, from engagement with the "Heat-Off" contact 114 into engagement with the "Heat-On" contact 116 and thus calls for heat, the field coil circuit will then be closed via the thermostat contact 116 and the therewith connected, closed switch 104. The motor will then immediately respond by cycling the arm 108 from the position in FIG. 7 counterclockwise into the position in FIG. 6 in which it opens the switch 104 and therewith the field coil circuit. The shaft 16 thus cycling with the arm 108 into the position in FIG. 6 will, through its pinion 94 thereon and the therewith meshing gear segment 96, shift the bar 92 into the dot-and-dash line position (FIG. 7) in which to cause the installation to deliver heat. The installation will thus deliver heat until the temperature rises to the point where the thermostat blade 112 flexes into engagement with the "Off" contact 114 and thus calls for shut-off of the heat. The field coil circuit is then closed via the thermostat contact 114 and the then closed switch 102. The motor will then immediately respond by cycling the arm 108 from the position in FIG. 6 clockwise into the position in FIGS. 5 and 7 in which it opens the switch 102 and therewith the field coil circuit. The shaft 16 thus cycling with the arm 108 into the position in FIGS. 5 and 7 will, through pinion 94 and gear segment 96, shift the bar 92 into the full-line position (FIG. 7) in which to cause the installation to shut-off heat. The installation will thus respond to the dictates of the thermostat 110 which under ordinary conditions calls for alternate heat delivery and shut-off. The installation will also accurately respond to the dictates of the thermostat under any and all other conditions. Thus, in case of power interruption, the control is ready to operate the installation in accordance with the dictates of the thermostat the moment power is restored. For example, assuming that on power interruption the cycling arm 108 is in the "Heat-On" position of FIG. 6 but no further heat is delivered, the thermostat blade 112 will remain in engagement with the "Heat-On" contact 116 owing to inadequate heat delivery, wherefore the installation will on power restoration continue the interrupted heat delivery until the thermostat calls for heat shut-off. Also, if during more lengthy power interruption the thermostat should respond to varying temperature of the surrounding atmosphere in repeatedly changing its setting for Heat-On and Heat-Off calls, the control will on power restoration be in immediate command of the installation, with the latter responding to the particular dictate of the thermostat at the time of power restoration, be it a call for heat or for no heat. Further, if power interruption should perchance occur in the course of cycling of the arm 108, the control will nevertheless be in immediate command of the installation when power is restored and regardless of the thermostat's dictate at the time of power restoration. For example, assuming that in response to the thermostat's call for heat shut-off (FIG. 7) the arm 108 responds by cycling from the position in FIG. 6 clockwise, but stops short of switch 102 owing to sudden power interruption, and further assuming that at the time of power restoration the thermostat blade 112 is in engagement with contact 116 calling for heat, the arm 108 may then start in either direction. If the arm 108 then starts in the right, counterclockwise, direction, it will soon open the switch 104 and thereby open the field coil circuit after the cycling shaft 16 has, through pinion 94 and gear segment 96, shifted the bar 92 into the correct dot-and-dash line "Heat-On" position (FIG. 7). However, if the arm 108 should start in the wrong, clockwise, direction, it will thus cycle clockwise to the end of its range B afforded by the cycling device 60 and then reverse into and run in the right, counterclockwise, direction until opening the switch 104 after shifting the bar 92 into the do-and-dash line "Heat-On" position (FIG. 7), with the brief opening of the other switch 102 by the arm 108 in the course of its described cycling being without any effect on the then closed circuit of the field coil of the motor, as will be readily understood. The cycling motor is thus a complete slave to the thermostat and responds to the dictates of the latter under any and all conditions.

While the described control 90 is, by virtue of the exemplary thermostat 110, applicable for a temperature-modifying installation, the same control with an atmospheric condition responsive instrumentality other than a thermostat is fully applicable with the same advantages to an installation for modifying the particular atmospheric condition. For example, the control may have a humidistat in lieu of a thermostat for application to a humidity-modifying installation.

The exemplary cycling motor 10 in the described control 90 takes advantage of a standard cycling part 62 with its plural-turn spiral groove 68, with the required effective shorter cycle range of the cycling device 60 being obtained by the use of two follower arms 64' and 64". It is, of course, entirely feasible to provide the motor in this control with any other cycling device, such as the cycling device 60b in FIG. 8, for example, in which the cycling part 62b carries an arm 140 which on impact with either fixed stop 142 and 144 reverses the part 62b and its driving rotor. The effective range of the cycling device 60b is thus of the extent Bb, while the normal operating range of the cycling part 62b under the control of therewith coordinated switches in a control such as in FIG. 7 may be of the extent Aa.

It is also feasible to use in a control such as that of FIG. 7 a motor of a cycle range of a plurality of turns. Such a motor is shown at 10c in FIG. 9 of which the cycling part 62c has in this iinstance a spiral groove of slightly more than two turns, and the switches 102c and 104c, which are arranged diametrically opposite each other with respect to the axis of the cycling shaft 16c, are offset from each other axially of the shaft 16c. The switch-actuating arm 108c is in this instance splined to the shaft 16c as at 150 so as to be turnable therewith as well as axially movable thereon, and the hub 152 of the arm 108c is provided with a cam groove 154 of over two turns with which cooperates a fixed follower 156. Thus, on cycling of the part 62c and its shaft 16c in opposite directions, the arm 108c will be shifted axially into alignment with the respective switches 102c and 104c for opening the latter near the adjacent ends of the cycling range of somewhat over two turns. The thus greater cycling range of the part 62c, arm 108c and shaft 16c permits a driving connection between the cycling shaft 16c and an exemplary temperature-modifying installation which advantageously may be a gear train of considerable speed reduction so that a motor of small size and minimum torque output will be adequate to operate the installation. A gear train to that end is indicated by the pinion 158 on the shaft 16c and the therewith meshing gear 160.

The earlier described control component or unit 88 (FIGS. 5 and 6) is advantageous as such for ready electrical connection in any control, as well as for operative connection with any installation, such as, for example, in the arrangement of FIG. 7. The control component 88 includes, besides the cycling motor 10 with its field coil and the cycling device 60, and the switches 102 and 104, also the lead connections 126 and 128 between those switches and one end of the field coil. The switches 102 and 104, which have the terminals 162, 164 and 166, 168 for circuit connection, are in this instance connected with their respective terminals 162 and 166 with the field coil by the leads 126 and 128, so that only the other terminals 164 and 168 of these switches and the other end of the field coil require circuit connecton for applying the control component 88 to a control such as that of FIG. 7.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a cycling synchronous motor, the combination with a field structure including a field coil, and a permanent-magnet rotor starting and running in either direction on energization of said coil, of a cycling device comprising a rotor-driven part with a rotary axis having about said axis a generally spiral groove of a pluarlity of turns with opposite end walls, and two elements each having a follower projecting into said groove and being mounted on said field structure for movement with its follower toward and away from said axis, with one follower being spaced a certain angular distance from one end wall of said groove when the other end wall thereof is in engagement with the other follower, whereby on the rotor drive and ensuing impact of said followers with the respective end walls of the groove said part and its driving rotor will cycle back and forth with the cycle range of said part being equal to said certain angular distance.

2. A control unit, comprising a cycling synchronous motor having a field structure including a field coil, a permanent-magnet rotor starting and running in either direction on energization of said coil, a rotor-driven part with a rotary axis having about said axis a generally spiral groove of a plurality of turns with opposite end walls, and two elements each having a follower projecting into said groove and being mounted on said field structure for movement with its follower toward and away from said axis, with one follower being spaced an angular distance of less than 360 degrees from one end wall of said groove when the other end wall thereof is in engagement with the other follower, whereby on the rotor drive and ensuing impacts of said followers with the respective end walls of the groove said part and the driving rotor will cycle back and forth, with the cycle range of said part being substantially equal to said angular distance; two alternative circuits for said coil including two normally-closed first switches, respectively, on said motor and another switch shiftable into two different positions to close said circuits, respectively, via the respective first switches when closed; and an actuator carried by said part to open said first switches, respectively, in any position of said part within predetermined first and second opposite end lengths, respectively, of said range whereby on all starts of said rotor in either direction said part will always turn into said first and second range end lengths in predetermined opposite directions, respectively.

References Cited

UNITED STATES PATENTS 2,105,514 1/1938 Welch.
2,398,994 4/1946 Bazley _____ 200—33
3,293,385 12/1966 Travaglio _____ 200—38

ORIS L. RADER, *Primary Examiner.*

K. L. CROSSON, *Assistant Examiner.*

U.S. Cl. X.R.

200—31, 38